(12) United States Patent
Boyd et al.

(10) Patent No.: US 11,353,131 B2
(45) Date of Patent: Jun. 7, 2022

(54) GATE VALVE BONNET CONNECTOR

(71) Applicant: FMC Technologies, Inc., Houston, TX (US)

(72) Inventors: Gareth Boyd, Houston, TX (US); Christopher Adams-Hernandez, Houston, TX (US); Bruno Freitas, Houston, TX (US)

(73) Assignee: FMC TECHNOLOGIES, INC., Houston, TX (US)

( * ) Notice: Subject to any disclaimer, the term of this patent is extended or adjusted under 35 U.S.C. 154(b) by 106 days.

(21) Appl. No.: 16/847,233

(22) Filed: Apr. 13, 2020

(65) Prior Publication Data
US 2020/0326006 A1 Oct. 15, 2020

Related U.S. Application Data

(60) Provisional application No. 62/834,202, filed on Apr. 15, 2019.

(51) Int. Cl.
*F16K 27/12* (2006.01)
*F16K 27/04* (2006.01)
(52) U.S. Cl.
CPC .............. *F16K 27/12* (2013.01); *F16K 27/04* (2013.01)
(58) Field of Classification Search
CPC ....................................... F16K 27/04
USPC ......................................... 251/367
See application file for complete search history.

(56) References Cited

U.S. PATENT DOCUMENTS

| | | | | |
|---|---|---|---|---|
| 3,355,192 A * | 11/1967 | Kloesel, Jr. | ........... | E21B 17/042 285/94 |
| 4,746,095 A * | 5/1988 | Roush | ...................... | F16K 27/12 137/315.36 |
| 4,968,002 A * | 11/1990 | Gibson | ................... | F16K 27/04 251/266 |
| 5,706,856 A * | 1/1998 | Lancaster | ............... | F16K 47/08 137/556.3 |
| 2009/0107685 A1 | 4/2009 | Cain et al. | | |
| 2015/0021506 A1 * | 1/2015 | Kinser | ................... | F16K 27/02 251/291 |
| 2016/0230897 A1 * | 8/2016 | Munetomo | .......... | F16K 3/0272 |
| 2016/0356390 A1 * | 12/2016 | Gifford | ................... | F16K 27/04 |

FOREIGN PATENT DOCUMENTS

CA          2585321 C      6/2011

* cited by examiner

*Primary Examiner* — Kevin R Barss
(74) *Attorney, Agent, or Firm* — Osha Bergman Watanabe & Burton LLP

(57) ABSTRACT

A bonnet assembly may be coupled to a valve block. The bonnet assembly may include a bonnet body extending, in an axial length, between a first and second end of the bonnet body. Additionally, the bonnet body may have a sealing surface on the second end. Further, a bonnet retainer nut may be provided with passage axially extending through a first end surface to a second end surface. The bonnet retainer nut may be disposed on the bonnet body such that a portion of the bonnet body is enclosed within the passage of bonnet retainer nut. Furthermore, the bonnet retainer nut may lock the bonnet body.

18 Claims, 4 Drawing Sheets

GATE VALVE BONNET CONNECTOR

FIELD OF DISCLOSURE

Embodiments disclosed herein relate generally to oil and gas production equipment. More particularly, embodiments disclosed herein relate to a quick change style bonnet for use on a valve block.

BACKGROUND

Oil and gas equipment may be used for many different applications. One particular application includes hydrocarbon production from a well, which involves extracting or removing hydrocarbon fluid from a formation below the surface of the land or seafloor. In systems, such as hydrocarbon production systems, water injection systems, or frac systems, a variety of flow control devices are used to control a flow rate, a pressure, and other parameters of a fluid flow. These flow control devices may include valves, pressure regulators, meters and gauges, and chokes. In addition, the flow control devices may be in a tree or wellhead, which is a complex configuration of actuable valves and other components. Trees or wellheads may be used onshore or offshore. Subsea trees or wellheads are currently operating offshore at every water depth, and are increasingly being used in deeper waters. The primary function of the subsea trees or wellheads is to control the flow of fluids into and out of a well, depending on whether it is an injection well or a production well. However, subsea trees or wellheads can also include other functionality to allow for troubleshooting, well servicing, etc. Because various operations may be performed at the wellhead, the arrangement of components may be modified to accommodate different operations, pressures, and implementations. For example, valves may be installed in the wellhead to isolate bores and outlets from pressures that may be higher than pressure-ratings for the wellhead's flange connections or to direct/restrict flow.

Bolted bonnets are widely used on trees, wellheads, or valve blocks. Bonnets come in many sizes, shapes and pressure ratings, and when used correctly they are a safe and reliable means for sealing valves and bores. In bolted bonnets, a body flange and a bonnet flange are joined by studs and nuts, with a gasket of suitable design/material inserted between the flange faces to facilitate sealing. In addition, bolts are tightened to prescribed torques in a pattern defined by the manufacturer to affect optimal sealing. However, as system pressure increases, the potential for leakage through the body/bonnet joint also increases. Additionally, a make-up time of the bolted Bonnets is about one to two hours each time as high torques are needed to be properly bolt the bonnets and bodies of the bonnet get frequently scrapped because of damage to threaded holes. With bolted bonnets, in conventional methods, the bonnet requires long assembly times with high torque, large bonnet components, and increase cost and non-productive downtime.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a bonnet assembly for a valve block. The bonnet assembly may include a bonnet body extending, in an axial length, between a first and second end of the bonnet body, wherein the bonnet body may include a sealing surface on the second end; and a bonnet retainer nut having passage axially extending through a first end surface to a second end surface, wherein the bonnet retainer nut is disposed on the bonnet body such that a portion of the bonnet body is enclosed within the passage of bonnet retainer nut, and wherein the bonnet retainer nut is configured to lock the bonnet body.

In another aspect, embodiments herein relate to a valve block that may include a body having one or more flow bores; a bonnet body is disposed at an end of the one or more flow bores bore, wherein a sealing surface of the bonnet body is connected to the end of the one or more flow bores; and a bonnet retainer nut disposed on the bonnet body, wherein a portion of the bonnet body is enclosed within a passage of the bonnet retainer nut, wherein a connection surface of the bonnet retainer nut connects with a connection surface of the body to lock the bonnet body to the body.

In yet another aspect, embodiments herein relate to a method for coupling a bonnet assembly to a valve block. The method may include connecting a sealing surface of a bonnet body to an end of one or more flow bores of the valve block; enclosing a portion of the bonnet body within a passage of a bonnet retainer nut; coupling a connection surface of the bonnet retainer nut to a connection surface of the valve block; abutting an internal shoulder of the bonnet retainer nut against an outer shoulder of a bonnet body; and locking the bonnet body within the valve block via the bonnet retainer nut coupled to the valve block.

Other aspects and advantages will be apparent from the following description and the appended claims.

DETAILED DESCRIPTION

Figure 1:
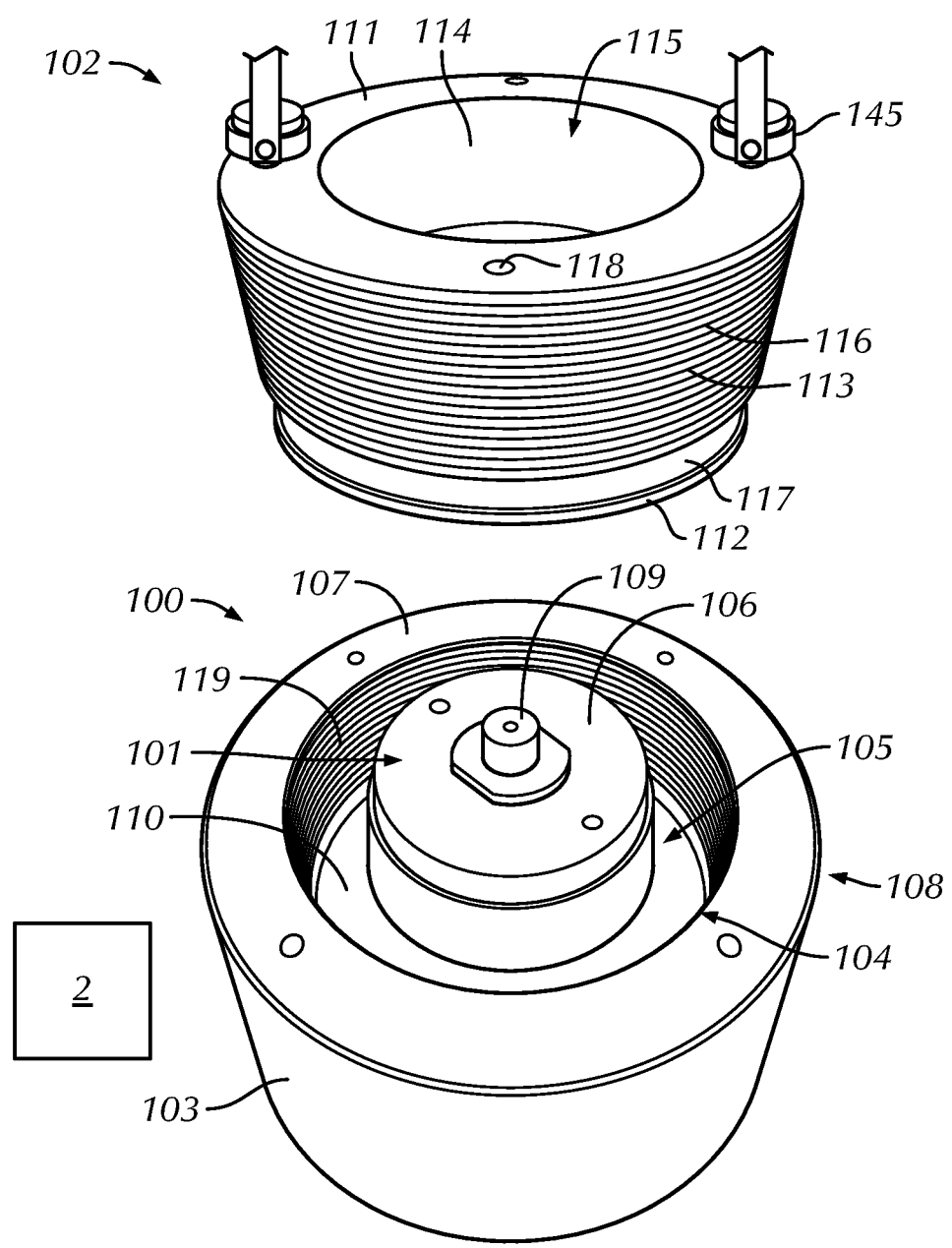
FIG. 1 is a perspective view of a bonnet assembly in accordance with one or more embodiments of the present disclosure.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a tree or valve block reference to a block with at least one bore that that control and regulate the flow of fluids for purposes of either injecting fluid (i.e. frac fluid) into an injection well or recovering hydrocarbons (i.e. reservoir fluid) from a production well. In addition, any terms designating tree or valve block (i.e., any wellheads or frac valves) at a rig type (i.e., any land rig or offshore rig) should not be deemed to limit the scope of the disclosure. As used herein, fluids may refer to slurries, liquids, gases, and/or mixtures thereof. It is to be further understood that the various embodiments described herein may be used in various stages of a well, such as rig site preparation, drilling, completion, abandonment etc., and in other environments, such as work-over rigs, fracking installation, well-testing installation, oil and gas production installation, without departing from the scope of the present disclosure. It is recognized by the different embodiments described herein that a tree or valve block plays a valuable and useful role in the life of a well. Further, it is recognized that the fluid flow configuration and arrangement of components for a subsea tree according to one or more embodiments described herein may provide a cost effective alternative to conventional subsea trees. The embodiments are described merely as examples of useful applications, which are not limited to any specific details of the embodiments herein.

In one aspect, embodiments disclosed herein relate to a bonnet assembly, such as bonnet that may be used in a valve block, for example. As used herein, the term "coupled" or "coupled to" or "connected" or "connected to" "attached" or "attached to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

According to embodiments of the present disclosure, bonnet assemblies are apparatuses that may be used to seal an opening of one or more flow bores of a valve block, which may be in fluid communication with a well, and be coupled to a body of the valve block. In one or more embodiments, the bonnet assembly may include two components: a bonnet body and a bonnet retainer nut. The bonnet body may be disposed is in a flow passage or cavity of at least one flow bore to seal the opening of the one or more flow bores. Depending on size, pressure rating and style, the bonnet body may include a seal (e.g., elastomer or metal) to sealingly attach to the one or more flow bores. The bonnet retainer nut may abut against the bonnet body to retain the bonnet body within the one or more flow bores. Further, a surface of the bonnet retainer nut is coupled to a surface of the body to lock the bonnet body within the one or more flow bores. For example, the connection surfaces of the bonnet retainer nut and the body may have threads that may be any type of threads, such as ACME threads, API threads, or specialty threads. It is further envisioned that the connection surfaces may include any mechanical coupler device to couple the bonnet retainer nut and the body together without departing from the present scope of the disclosure.

Turning to FIG. 1, FIG. 1 shows a perspective view of a bonnet assembly 100 disassembled partially in a valve block 103 in accordance with one or more embodiments of the present disclosure. FIG. 1 is a simplified elevation view and one of ordinary skill will understand that additional components may be added or used in conjunction with the valve block 103 shown in FIG. 1. In one or more embodiments, the valve block 103 is an assembly of one or more tubulars, valves, and other components that may be configured to operate in conjunction with a subsea well. The valve block 103 may include at least one generally cylindrical tubular with one or more flow bores 105 located internally within the valve block 103. In one or more embodiments, the valve block 103 is coupled to a wellhead of a subsea well (not shown). Those of ordinary skill in the art will appreciate that there are many techniques and methods which may be used to connect the valve block 103 to a subsea wellhead that may be applicable to the embodiments described herein, including, using a tree connector.

In one or more embodiments, the bonnet assembly 100 may include a bonnet body 101 and a bonnet retainer nut 102 as two separate components. It is further envisioned that the bonnet body 101 and the bonnet retainer nut 102 may be molded or welded together to form one uniform bonnet. In a non-limiting example, the bonnet body 101 and the bonnet retainer nut 102 may be made of metal such as steel, iron, treated iron, or any metal alloy.

As further shown in FIG. 1, the bonnet body 101 is inserted into an opening 104 of the valve block 103 such that the bonnet body 101 is within the one or more flow bores 105 of the valve block 103. In some embodiments, at a first end, a flange 106 of the bonnet body 101 may extend past the opening 104 to be above a surface 107 at an end 108 of the block valve 103. Additionally, the flange 106 may include a lug 109 to close a bore (see FIG. 2) of the bonnet body 101. It is further envisioned that a wheel or an actuating device (i.e., pneumatic or hydraulic) may be attached to the lug 109. Furthermore, at a second end 110 of the bonnet body 101 extending axially from the first end, which is within the one or more flow bores 105, the bonnet body 101 may have a sealing surface (see FIG. 2). On the sealing surface, the bonnet body 101 may have a seal that may be any type of seal, such as elastomer seals, metal seals, plastic seals, or specialty seals.

In some embodiments, the bonnet retainer nut 102 may be a ring extending axially from a first end surface 111 to a second end surface 112. Additionally, an exterior surface 113 is formed from the first end surface 111 to the second end surface 112 as the outer surface of the bonnet retainer nut 102. In addition, an interior surface 114 is formed from the first end surface 111 to the second end surface 112 as the inner surface of the bonnet retainer nut 102 such that a passage 115 is formed. It is noted that passage 115 may have a diameter greater than a diameter of the flange 106 of the bonnet body 101 but less than a diameter of the second end 110 of the bonnet body 101. It is further envisioned that the first end surface 111 of the bonnet retainer nut 102 may have at least one hole 118 for an insert 145 or wrench to connect to. It is noted that while a hole is shown, a lug extending outwardly may be used in place of the hole without departing from the present scope of the disclosure. Further, one skilled in the art will appreciate how the at least one torque connection 118, such as a hole, may be used to apply torque on the bonnet retainer nut 102. For example, a hammer or a wrench may be used to apply a force on the hole to rotate and torque the bonnet retainer nut 102. While it is noted that FIG. 1 shows four torque connections 118 (two open, two with inserts) equally spaced apart, one of skill in the art would understand that this is merely a non-limiting example and any number of torque connections 118 may be used without departing from the present scope of the disclosure. It is further envisioned that the bonnet body 101 may be press fitted prior to or concurrently to the bonnet retainer nut 102 being torque to energize a seal between the bonnet body 101 and the valve block 103.

Still referring to FIG. 1, in one or more embodiments, threads 116 may be provided on a surface of the bonnet retainer nut 102 to form a connection surface. For example, the threads 116 may be provided on the exterior surface 113 of the bonnet retainer nut 102, with or without a stress relief 117 at the second end surface 112. Additionally, threads 119 may be provided on a surface of the valve block 103 to form a connection surface that is to be connected to the connection surface of the bonnet retainer nut 102. For example, the threads 119 may be provided on a portion (e.g., a surface or cavity) of the one or more flow bores 105 to form the connection surface to engage the threads 116 of the bonnet retainer nut 102 and lock/retain the bonnet body 101 within the valve block 103. One skilled in the art will appreciate how the threads 116, 119 that may be any type of threads, such as ACME threads, API threads, or specialty threads. Further, a pipe dope may be added to the threads 116, 119 to aid in the make-up of the bonnet retainer nut 102 to the valve block 103. While it is noted that FIG. 1 shows threads (116, 119) to make-up the bonnet retainer nut 102 to the valve block 103, one of skill in the art would understand that the use of threads is merely a non-limiting example and any different type of mechanical coupler may be used without departing from the present scope of the disclosure to couple the bonnet retainer nut 102 to the valve block 103.

Figure 2:
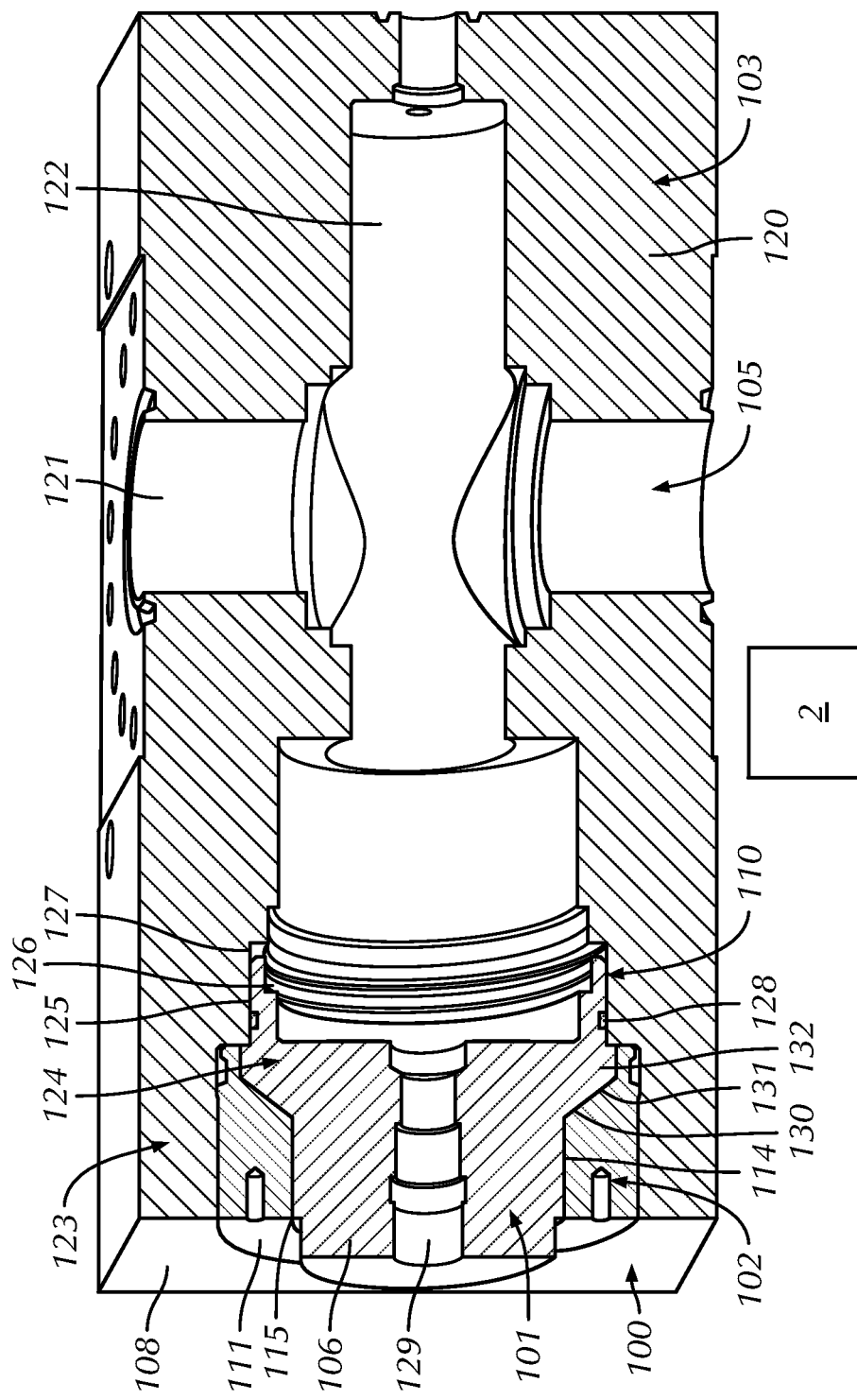
FIG. 2 is a cross-sectional view of a bonnet assembly along a plane of FIG. 1 in accordance with one or more embodiments of the present disclosure.

Referring to FIG. 2, FIG. 2 shows a cross-sectional view, along plane 2 in FIG. 1, of the bonnet assembly 100 assembled in the valve block 103 in accordance with one or more embodiments of the present disclosure. The valve block 103, as shown in FIG. 2, may have a body 120 made of a metal block with the one or more flow bores 105. For example, the valve block 103 may be a portion of a vertical tree; such that the valve block 103 may have at least one vertical flow bore 121. In one or more embodiments, the valve block 103 is landed or located above a well, and the vertical flow bore 121 may be in fluid communication with a flow bore of the well. Further, in one or more embodiments, the vertical flow bore 121 of the valve block 103 may be concentric with the flow bore of a well (not shown). As will be recognized by those skilled in the art, the valve block 103 may take other forms or have other features. For example, the valve block 103 may have a non-vertical, e.g. at least one horizontal flow bore 122 with the opening (104) in the valve block 103. Further, the horizontal flow bore 122 may be perpendicular and in fluid communication with the vertical flow bore 121 such that the vertical flow bore 121 may be accessed through the horizontal flow bore 122. Thus, those of ordinary skill will appreciate that the present embodiments may be altered and are not limited to the illustrative configurations of the valve block 103 depicted in the attached drawings.

As illustrated in FIG. 2, in one or more embodiments, the bonnet assembly 100 may be coupled to the valve block 103 at an end 123 in of the horizontal flow bore 122. For example, the bonnet body 101 is within a cavity 124 at the end 123 such that protrusions 125 of the bonnet body 101 have the sealing surface 126 at the second end 110 of the bonnet body 101. Further, the seal 127 may be at an end of the protrusions 125 to seal the horizontal flow bore 122. It is further envisioned that a second seal 128 or bearing may be disposed on an outer surface of the protrusions 125 to seal on the body 120 of the valve block 103. The seal 127 and the second seal 128 may be made of the same or different material such as an elastomer, metal or a combination thereof. In some embodiments, the bonnet body 101 may include a bore 129 in fluid communication with the horizontal flow bore 122. As discussed above, the bore 129 may be closed by the lug (see FIG. 1) for a wheel or an actuating device (i.e., pneumatic or hydraulic) to be attached to. Further, the flange 106 of the bonnet body 101 may extend past the end 108 of the valve block 103.

In some embodiments, the bonnet retainer nut 102 may retain the bonnet body 101 within the block valve 103. For example, the passage 115 of the bonnet retainer nut 102 surrounds a portion of the bonnet body 101. It is further envisioned that the interior surface 114 of the bonnet retainer nut 102 may have an internal load shoulder 130 to contact and abut an outer load shoulder 131 on an outer surface 132 of the bonnet body 101. In a non-limiting example, the internal load shoulder 130 may be slanted at an angle from the interior surface 114 to match an angle at which the outer load shoulder 131 is slanted from the outer surface 132. While it is noted that FIG. 2 shows the load shoulders 130, 131 as slanted, one of skill in the art would understand that this is merely a non-limiting example and the loads shoulders 130, 131 may be any angle without departing from the present scope of the disclosure.

In one or more embodiments, the bonnet retainer nut 102 sits within the cavity 124 such the first end surface 111 of the bonnet retainer nut 102 is flush with the end 108 of the block valve 103. In a non-limiting example, the connection surface (e.g., threads 116) of the bonnet retainer nut 102 is connected to the connection surface (e.g., threads 119) of the valve block 103 to fully insert the bonnet retainer nut 102 within the valve block 103. One skilled in the art will appreciate how the bonnet retainer nut 102 is made-up to the valve block 103 such that the internal load shoulder 130 of the bonnet retainer nut 102 abuts the outer load shoulder 131 of the bonnet body 101.

Figure 3:
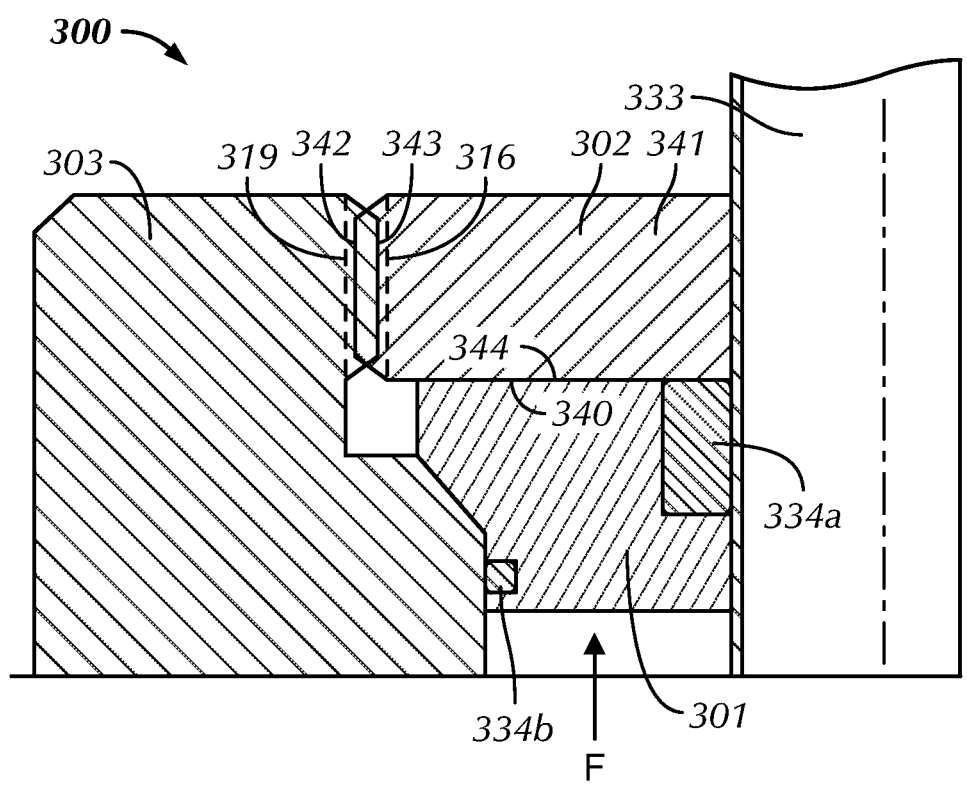
FIG. 3 is a cross-sectional view of a bonnet assembly in accordance with one or more embodiments of the present disclosure.

Now referring to FIG. 3, in one or more embodiments, a cross-sectional view of a bonnet assembly 300 in a valve block 303 having a tubular 333, such as a valve stem, in a flow bore 305 of the valve block 303 is illustrated. It is noted that a bonnet body 301 of the bonnet assembly 300 may be a packer for the valve block 303. In a non-limiting example, the bonnet body 301 may have a tubular seal 334a to create seal around the tubular 333. Further, in some embodiments, a force (arrow F), such as a hydraulic fluid pressure, may act on the bonnet body 301 to push the bonnet body 301 upward and against the tubular 333. Additionally, the bonnet body 301 seals against the surface of the flow bore 305. Additionally, a second seal 334b may be provided on the bonnet body 301 to create seal between the valve block 303 and the bonnet body 301. In order to retain the bonnet body 301 within the valve block 303, a bonnet retainer nut 302 is coupled to the valve block 303 such the bonnet body 301 abuts against the bonnet retainer nut 302.

In one or more embodiments, FIG. 3 illustrates that the bonnet retainer nut 302 may be a cylindrical block 341 with the connection surface (e.g., threads) on an outer side 342 of the bonnet retainer nut 302. The outer side 342, provided with the threads, is made-up to threads provided on an inner end surface 343 of the valve block 303. With the bonnet retainer nut 302 as the cylindrical block 341, the upper surface 340 of the bonnet body 301 abut against a bottom surface 344 of the bonnet retainer nut 302 such the force (arrow F) is equal to or less than the force created by the bonnet retainer nut 302 abutting against the bonnet body 301. It is further envisioned that the bottom surface 344 of the bonnet retainer nut 302 may also be used to retain the tubular seal 334a from being moved or displaced. While it is noted that while FIG. 3 shows the bonnet retainer nut 302 as the cylindrical block 341, one of skill in the art would understand that this is merely a non-limiting example and the bonnet retainer nut 302 may be any shape without departing from the present scope of the disclosure.

Figure 4:
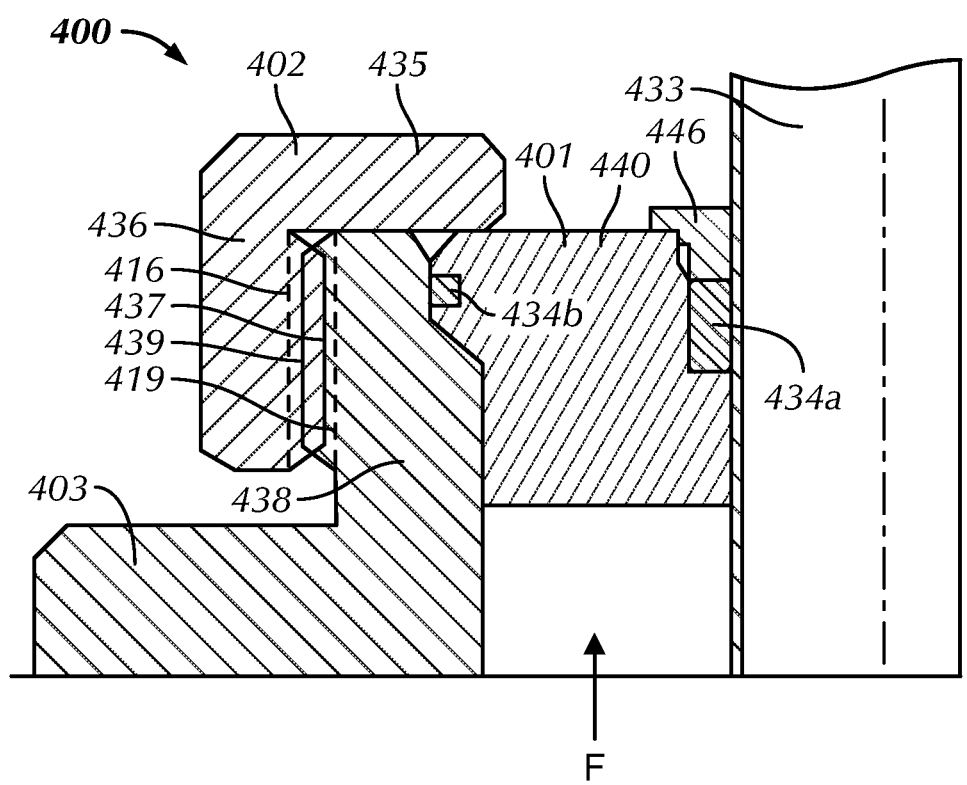
FIG. 4 is a cross-sectional view of a bonnet assembly in accordance with one or more embodiments of the present disclosure.

Now referring to FIG. 4, in other embodiments, a cross-sectional view of a bonnet assembly 400 in a valve block 403 having a tubular 433, such as a valve stem, in a flow bore 405 of the valve block 403 is illustrated. It is noted that a bonnet body 401 of the bonnet assembly 400 may be a packer for the valve block 403. In a non-limiting example, the bonnet body 401 may have a tubular seal 434a to create seal around the tubular 433. Further, in some embodiments, a force (arrow F), such as a hydraulic fluid pressure, may act on the bonnet body 401 to push the bonnet body 401 upward and against the tubular 433. Additionally, the bonnet body 401 seals against the surface of the flow bore 405. Additionally, a second seal 434b may be provided on the bonnet body 401 to create seal between the valve block 403 and the bonnet body 401. In order to retain the bonnet body 401 within the valve block 403, a bonnet retainer nut 402 is coupled to the valve block 403 such the bonnet body 401 abuts against the bonnet retainer nut 402.

As illustrated in FIG. 4, in one or more embodiments, the bonnet retainer nut 402 may have a horizontal portion 435 connected to a vertical portion 436 forming a collar. Additionally, the connection surface (e.g., threads) of the bonnet retainer nut 402 may be provided on an inner surface 437 of the vertical portion 436. Further, the valve block 403 may include a projection 438 with an outer surface 439 provided with the connection surface (e.g., threads) of the valve block 403. As discussed above, the bonnet retainer nut 402 retains the bonnet body 401 in the valve block 403. In order to ensure the bonnet body 401 is locked within the valve block 403, the connection surface (e.g., the threads on the inner surface 437) of the bonnet retainer nut 402 is coupled to the connection surface (e.g., the threads on the outer surface 439) of the valve block 403 to have an upper surface 440 of the bonnet body 401 abut against the horizontal portion 435 of the bonnet retainer nut 402. One skilled in the art will appreciate how the bonnet body 401 abutting against the bonnet retainer nut 402 creates a force in an opposite direction and equal to or more than the force (arrow F) acting on the bonnet body 401. It is further envisioned that a seal retention device 446 may be coupled to the bonnet retainer nut 402 to retain the tubular seal 434a from being moved or displaced. While it is noted that while FIG. 4 shows the bonnet retainer nut 402 as an L-bracket, one of skill in the art would understand that this is merely a non-limiting example and the bonnet retainer nut 402 may be any shape without departing from the present scope of the disclosure.

Furthermore, methods of the present disclosure may include use of the bonnet assembly (100, 300, 400) and other structures, such as in FIGS. 1-4 for coupling a bonnet assembly to a valve block. Because the method may apply to any of the embodiments, reference numbers are not referenced to avoid confusion of the numbering between the different embodiments.

Initially, a bonnet body is inserted into a flow bore of a valve block. In non-example, a sealing surface of the bonnet body is connected to a cavity at an end of valve block in fluid communication of the flow bore. Further, a seal disposed in the sealing surface such that the seal sealingly closes the cavity. Then a bonnet retainer nut is placed in the cavity to enclose a portion of the bonnet body within a passage of the bonnet retainer nut. Next, a connection surface of the bonnet retainer nut is coupled to a connection surface of the valve block. In a non-limiting example, threads are provided on the connection surfaces of the bonnet retainer nut and the valve block. Further, the threads of the bonnet retainer nut are threaded with the threads of the valve block. One skilled in the art will appreciate how the threading of the connections is aided by applying a force or torque, with a hammer or wrench (manually or hydraulic), to at least one torque connection (i.e., hole) of the bonnet retainer nut. The bonnet retainer nut torqued such that an internal shoulder of the bonnet retainer nut abuts against an outer shoulder of a bonnet body. Furthermore, the bonnet body is locked within the valve block by having the bonnet retainer nut threaded fully to has an end of the bonnet retainer nut flush with the end of the valve block. It is further envisioned a seal between the bonnet body and the valve block may be energized by press fitting the bonnet body prior or concurrently to the bonnet retainer nut being torque. As such, a bonnet assembly is formed by combining the body bonnet and the bonnet retainer nut together in the valve block to seal an end of the flow bore. Furthermore, by sealing the bonnet body against the flow bore with the bonnet retainer nut, there may be no fluid leaks between the end of the flow bore. Once the seal is created and the bonnet assembly coupled within the flow bore, the valve block is pressure-controlled and ready for use.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A bonnet assembly for a valve block, the bonnet assembly comprising:
   a bonnet body extending, in an axial length, between a first and second end of the bonnet body, wherein the bonnet body comprises a sealing surface on the second end; and
   a bonnet retainer nut having passage axially extending through a first end surface to a second end surface,
   wherein the bonnet retainer nut is disposed on the bonnet body such that a portion of the bonnet body is enclosed within the passage of bonnet retainer nut,
   wherein the bonnet retainer nut is configured to lock the bonnet body, and
   wherein the first end surface of the bonnet retainer nut comprises at least one torque connection.

2. The bonnet of claim 1, wherein an internal load shoulder of the bonnet retainer nut contacts an outer load shoulder of the bonnet body.

3. The bonnet of claim 1, wherein the sealing surface comprises an elastomer or metal seal.

4. The bonnet of claim 1, wherein an outer surface of bonnet retainer nut comprises a connection surface.

5. The bonnet of claim 4, wherein the connection surface is threaded and comprises a stress relief at an end of the threads.

6. The bonnet of claim 1, wherein the first end of the bonnet body extends past the first end surface of the bonnet retainer nut and the second end of the bonnet body extends past the second end surface of the bonnet retainer nut.

7. The bonnet of claim 1, wherein a bore of the bonnet body is closed by a lug extending axially from the first end.

8. The bonnet of claim 7, further comprising a wheel or an actuating device attached to the lug.

9. A valve block, comprising:
   a body having one or more flow bores;

a bonnet body is disposed at an end of the one or more flow bores bore, wherein a sealing surface of the bonnet body is connected to the end of the one or more flow bores; and a bonnet retainer nut disposed on the bonnet body, wherein a portion of the bonnet body is enclosed within a passage of the bonnet retainer nut, wherein a connection surface of the bonnet retainer nut connects with a connection surface of the body to lock the bonnet body to the body, and wherein a first end surface of the bonnet retainer nut comprises at least one torque connection.

10. The valve block of claim 9, wherein the bonnet body is disposed within a cavity at the end of the one or more flow bores.

11. The valve block of claim 9, wherein the sealing surface comprises an elastomer or metal seal to sealingly close the one end of the one or more flow bores.

12. The valve block of claim 9, wherein the connection surface of the bonnet retainer nut is an outer surface of bonnet retainer nut and the connection surface of the body is an inner surface of the body.

13. The valve block of claim 9, wherein the connection surface of the bonnet retainer nut is an inner surface of bonnet retainer nut and the connection surface of the body is an outer surface of the body.

14. The valve block of claim 9, wherein the connection surface of the bonnet retainer and the connection surface of the body are threaded.

15. The valve block of claim 9, wherein the first surface end of the bonnet retainer nut is flush with the end of the one or more flow bores.

16. The valve block of claim 9, wherein a first end of the bonnet body extends past the end of the one or more flow bores.

17. A method for coupling a bonnet assembly to a valve block, the method comprising:
    connecting a sealing surface of a bonnet body to an end of one or more flow bores of the valve block;
    enclosing a portion of the bonnet body within a passage of a bonnet retainer nut;
    coupling a connection surface of the bonnet retainer nut to a connection surface of the valve block, wherein the coupling comprises applying torque to at least one torque connection in a surface of the bonnet retainer nut;
    abutting an internal shoulder of the bonnet retainer nut against an outer shoulder of a bonnet body; and
    locking the bonnet body within the valve block via the bonnet retainer nut coupled to the valve block.

18. The method of claim 17, further comprising sealing a cavity of the end of the one or more flow bores of the valve block with the bonnet body.

\* \* \* \* \*